(12) United States Patent
Oz et al.

(10) Patent No.: US 10,623,427 B2
(45) Date of Patent: Apr. 14, 2020

(54) ADAPTIVE ONLINE DATA ACTIVITY PROTECTION

(71) Applicant: MICROSOFT TECHNOLOGY LICENSING, LLC, Redmond, WA (US)

(72) Inventors: Roee Oz, Tel Aviv (IL); Yuval Eldar, Shoham (IL); Royi Ronen, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 204 days.

(21) Appl. No.: 15/699,581

(22) Filed: Sep. 8, 2017

(65) Prior Publication Data

US 2019/0081965 A1    Mar. 14, 2019

(51) Int. Cl.
*H04L 29/06* (2006.01)
*G06F 21/55* (2013.01)
*G06N 20/00* (2019.01)
*G06F 21/62* (2013.01)

(52) U.S. Cl.
CPC ........ *H04L 63/1425* (2013.01); *G06F 21/552* (2013.01); *G06F 21/554* (2013.01); *G06N 20/00* (2019.01); *H04L 63/1416* (2013.01); *G06F 21/6245* (2013.01); *H04L 63/1441* (2013.01)

(58) Field of Classification Search
CPC ............. H04L 63/1425; H04L 63/1416; H04L 63/1441; G06F 21/552; G06F 21/554; G06F 21/6245; G06N 20/00
See application file for complete search history.

(56) References Cited

U.S. PATENT DOCUMENTS

| 8,046,374 | B1 | 10/2011 | Bromwich | |
|---|---|---|---|---|
| 8,893,300 | B2 | 11/2014 | Ramachandran et al. | |
| 9,256,748 | B1 * | 2/2016 | Gates | G06F 21/32 |
| 9,754,109 | B1 * | 9/2017 | Parker-Wood | G06F 21/57 |
| 10,320,819 | B2 * | 6/2019 | Watson | G06N 5/045 |
| 2014/0059686 | A1 * | 2/2014 | Lin | G06F 11/076 726/23 |
| 2014/0165195 | A1 * | 6/2014 | Brdiczka | G06F 21/552 726/23 |
| 2014/0215618 | A1 | 7/2014 | Striem Amit | |

(Continued)

OTHER PUBLICATIONS

Seo, et al., "Data Leakage Detection System based on Deep Learning", In Proceedings of Data Leakage Detection System based on Deep Learning, vol. 4, No. 2, Retrieved on: Jun. 30, 2017, pp. 13-18.

(Continued)

*Primary Examiner* — Christopher C Harris
(74) *Attorney, Agent, or Firm* — Fiala & Weaver P.L.L.C.

(57) ABSTRACT

Systems and methods for identifying and responding to anomalous data activity by a computer user on a computing device are presented. An anomalous data activity service, implemented as a machine learning service, receives notice of data activity and conducts an evaluation to determine whether the data activity is an anomalous data activity. Upon determining that the data activity is an anomalous data activity, a responsive action may be taken that may result in the anomalous data activity being blocked or allowed.

20 Claims, 5 Drawing Sheets

(56) References Cited

U.S. PATENT DOCUMENTS

2015/0106870 A1* 4/2015 Li ............... G06F 16/9535 726/1
2017/0093902 A1 3/2017 Roundy et al.

OTHER PUBLICATIONS

"Data Loss/ Leakage Prevention", Retrieved from:«http://www.wayzon.in/?page_id=85», Jan. 2014, 1 Page.

Cheng, et al., "Enterprise Data Breach: Causes, Challenges, Prevention, and Future Directions", Retrieved from: «http://onlinelibrary.wiley.com/doi/10.1002/widm.1211/full», Jun. 9, 2017, 18 Pages.

"Mitigate External Threats with EventLog Analyzer's Unified Security Data Analytics", Retrieved from:«https://www.manageengine.com/products/eventlog/monitor-threat-intelligence-solutions.html», Retrieved on: Jun. 30, 2017, 2 Pages.

Wei, Wang, "Data loss prevention—Log & Event manager", Retrieved from:«http://thehackernews.com/2015/01/data-loss-prevention-tools.html», Jan. 14, 2015, 3 Pages.

"Data Leakage Prevention", Retrieved from:«https://www.cyberoam.com/dataleakageprevention.html», Retrieved on: Jun. 30, 2017, 1 Page.

"Security Audit Logging Guideline", Retrieved from:«https://security.berkeley.edu/security-audit-logging-guideline», Retrieved on: Jun. 30, 2017, 2 Pages.

Anderson, et al., "Security Policies", Retrieved from:«https://www.cl.cam.ac.uk/~rja14/Papers/security-policies.pdf», Retrieved on: Jun. 30, 2017, pp. 1-43.

"Azure Advanced Threat Detection", Retrieved from:«https://docs.microsoft.com/en-us/azure/security/azure-threat-detection», Published on: Apr. 27, 2017, 25 Pages.

"Data Loss Prevention", Retrieved from:«http://www.ey.com/Publication/vwLUAssets/EY_Data_Loss_Prevention/$FILE/EY_Data_Loss_Prevention.pdf», Oct. 2011, 24 Pages.

Magalhaes, Ricky, "Data Leakage Prevention", Retrieved from:«http://techgenix.com/data-leakage-prevention/», Sep. 21, 2011, 9 Pages.

"International Search Report and Written Opinion Issued in PCT Application No. PCT/US2018/039635", dated Sep. 19, 2018, 10 Pages.

* cited by examiner

ADAPTIVE ONLINE DATA ACTIVITY PROTECTION

BACKGROUND

Countless numbers of organizations and businesses store important, often sensitive data in an online manner, i.e., stored on or accessible over a network. This data may be embodied in a variety of forms, including databases, calendars, documents, email, and the like. This data may be stored online (or network accessible) in various systems and services, such as content management systems, electronic filing systems, database services, network storage devices, or other storage solutions.

In attempting to maintain the sensitive nature of the data, these services and systems attempt to restrict online access to the data, whether such access is simply to review data, retrieve the data, or use and/or modify the data. The restrictions come in the form of policies that govern who can access the data, how the data can be accessed, where the data can be stored, and whether the data can be shared with others (and whom). However, such restrictions and policies require both end-user knowledge of them and end-user goodwill in keeping them. Indeed, most data leaks occur because of mistake and/or ignorance of policies governing data access. As such, there are numerous instances of both intentional and unintentional use of restricted data, many of which result in significant financial, personal or other unfortunate consequences.

Simple, yet common examples of unauthorized "data activity" include sharing content with someone not authorized to view the content, and/or storing protected data in an area where others not authorized to view it can access the data. Yet another example may be an employee maliciously leaking sensitive data to others, or an employee bypassing company policy by taking sensitive data upon leaving his job, thereby jeopardizing the security of the data and violating privacy constrains. Still another example is a malware attack that results in the exposure of sensitive data to a malicious organization.

For the systems and services that store the excess-restricted data, unauthorized activity on the data exposes the system/service maintaining the data to potential business damage, financial loss, reputation damage, legal and/or regulatory challenges due to privacy regulations violations.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems and methods for identifying and responding to anomalous data activity by a computer user on a computing device are presented. An anomalous data activity service, implemented as a machine learning service, receives notice of data activity and conducts an evaluation to determine whether the data activity is an anomalous data activity. Upon determining that the data activity is an anomalous data activity, a responsive action may be taken that may result in the anomalous data activity being blocked or allowed.

According to additional aspects of the disclosed subject matter, a computer-implemented method for responding to an anomalous data activity of a computer user on a computing device is presented. The method includes initializing an anomalous data activity service. According to the disclosed subject matter, the anomalous data activity service is an online, machine learning service for identifying whether a data activity is an anomalous data activity. In operation, a notice of a data activity regarding an item of data by a computer user using the computing device is received. The data activity regarding the item of data is then evaluated to determine whether the data activity is an anomalous data activity. Upon determining that the data activity regarding the item of data is an anomalous data activity, a response activity regarding the anomalous data activity is carried out. Thereafter, the anomalous data activity service is updated according to the response activity in view of the anomalous data activity.

According to further aspects of the disclosed subject matter, a computing device for responding to an anomalous data activity by a computer user on the computing device is presented. The computing device includes an executable anomalous data activity service. Moreover, the anomalous data activity service is implemented an online, machine learning service for identifying whether a data activity is an anomalous data activity. In execution on the computing device, the anomalous data activity service receives notice of a data activity regarding an item of data by a computer user. In response, the anomalous data activity service evaluates the data activity to determine whether the activity constitutes anomalous data activity. Upon determining that the data activity is an anomalous data activity, the anomalous data activity service carries out a response activity regarding the anomalous data activity. Thereafter, the anomalous data activity service is updated for machine learning purposes according to the response activity in view of the anomalous data activity.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Existing solutions controlling unauthorized activity with protected data include access and usage control systems and tracking systems. As the name suggests, access and usage control systems govern access and/or usage ("data activity") of the data. These systems control who can access the data, how the data can be access, and how the data can be used. Alternatively, audit and tracking systems track or audit the various activities with regard to protected data according to access and usage logs, i.e., after the fact activity. These latter systems attempt to identify where and when unauthorized activity took place, who was responsible, and how it occurred.

Unfortunately, existing systems work according to hard-coded rules. In implementing rules, access and usage control systems must inspect each document or data activity separately. These systems then detect events (potential violations) defined by the hard-coded rules on a per document, per data activity basis. Additionally, in inspecting each document separately, these systems tend to generate numerous false negatives (unauthorized data activity wrongly identified as permissible) and false positives (authorized activity wrongly identified as unauthorized.) In short, they aren't flexible and don't learn from user actions.

According to aspects of the disclosed subject matter, adaptive online data protection techniques are provided to differentiate between authorized and unauthorized use of protected data, as well as learn from on-going user data activity to distinguish between authorized and unauthorized data activity. In contrast to existing systems, aspects of the disclosed subject matter implement at-the-moment detections of unauthorized and/or abnormal "data activity" without the need for an administrator to have previously encoded each and every rule regarding data activity. Advantageously, systems and methods that implement aspects of the disclosed subject matter are able to provide a more robust and easier to use data activity detection system (in regard to permitting authorized data activity and taking action on unauthorized data activity.) Additionally, the number of false positives (unauthorized activity falsely identified as authorized) and false negatives (authorized data activity falsely identified as unauthorized data activity) generated by a suitably configured system or method are substantially reduced.

According to additional aspects of the disclosed subject matter, the adaptive machine learning techniques can be combined with a classification and/or labeling system with regard to items of data, associating data items with a particular classification or label to identify a sensitivity level with regard to specific items of data. With information regarding the particular sensitivity of a data item, the machine learning techniques for differentiating between authorized and unauthorized data activity can be provided.

For purposes of clarity and definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with regard to multiple items should be viewed as meaning either or both items.

The term "data activity" refers to any activity relating to a particular item of data. Data activity includes, by way of illustration and not limitation, viewing, saving, deleting, modifying, copying, and/or printing of one or more data items. An "anomalous data activity" corresponds to a data activity with regard to one or more data items that falls outside of what is viewed as typical or normal behavior. An anomalous data activity may or may not constitute an unauthorized data activity, i.e., one that is in violation of general data activity policies. "Data items," those items for which protection is sought, includes, by way of illustration and not limitation, images, documents, databases, logs, lists, video and/or audio content, calendars, email, communication content, and the like. Indeed, a "data item" may comprise any item information or content for which anti-leak or anti-loss protection is sought.

Figure 1:
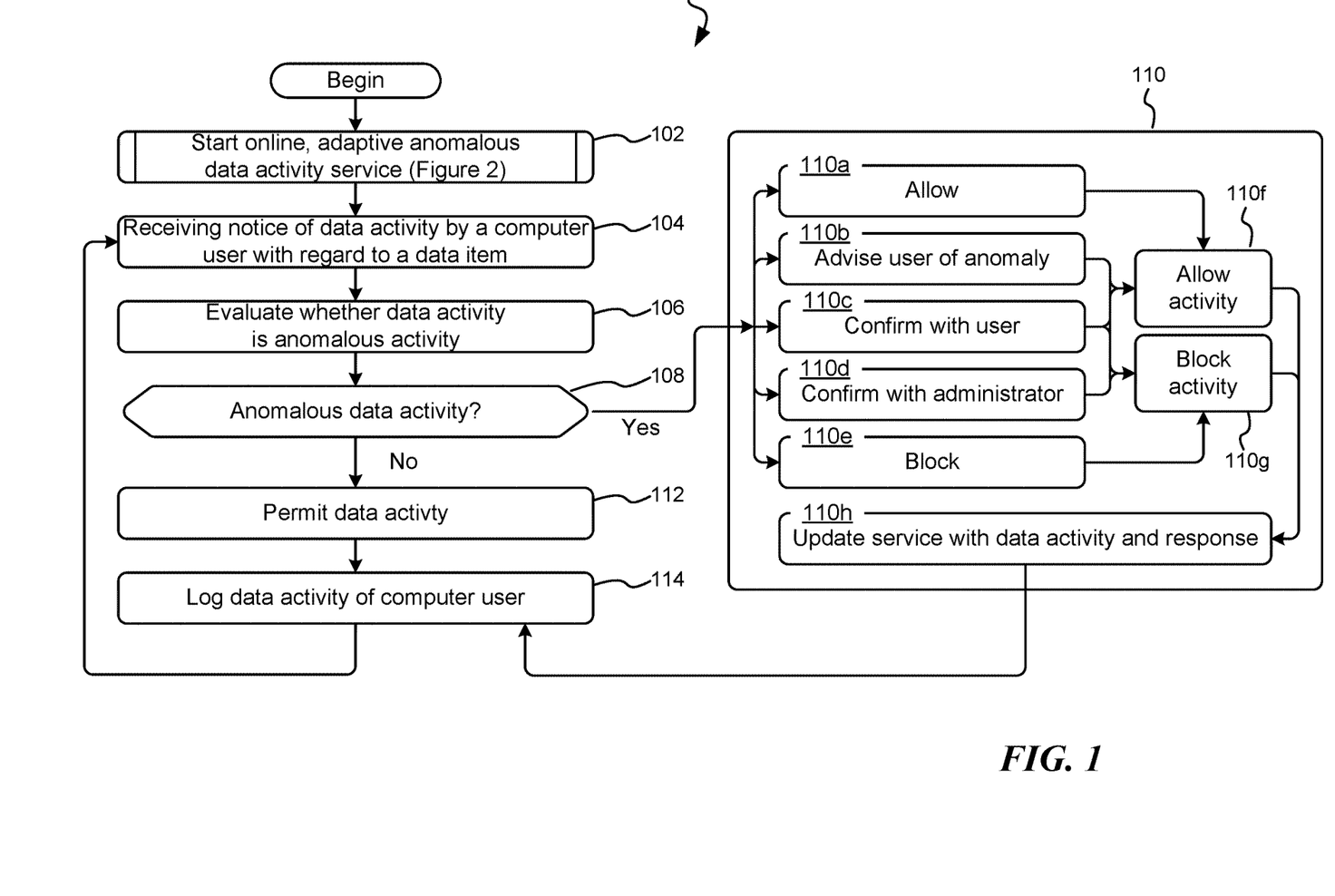
FIG. 1 is a flow diagram illustrating an exemplary routine suitable for providing adaptive online data activity protection, according to aspects of the disclosed subject matter.

To better illustrate the disclosed subject matter, including illustrative systems and methods of adaptive online data protection, reference is now made to the figures. FIG. 1 is a flow diagram illustrating an exemplary routine 100 suitable for providing adaptive online data activity protection, according to aspects of the disclosed subject matter. Beginning at block 102, an online, adaptive anomalous data activity service is started.

Advantageously, the anomalous data activity service operates in an online manner, i.e., it is generally available at a given moment to respond to a request as to whether a particular data activity with regard to one or more data items is an anomalous data activity, potentially indicating an unauthorized data activity. The anomalous data activity service is also, advantageously, adaptive executable model, meaning that in execution the service implements machine learning techniques in that it learns to differentiate (by way of generating predictions) between authorized and unauthorized data activity without being explicitly programmed to make such determinations. Learning for the service is based on user feedback with regard to data activities that have been identified as anomalous behaviors. One example, by way of illustration, of an adaptive, online service that may be configured to identifying anomalous data activity is Microsoft's User and Entity Behavior Analysis service.

Figure 2:
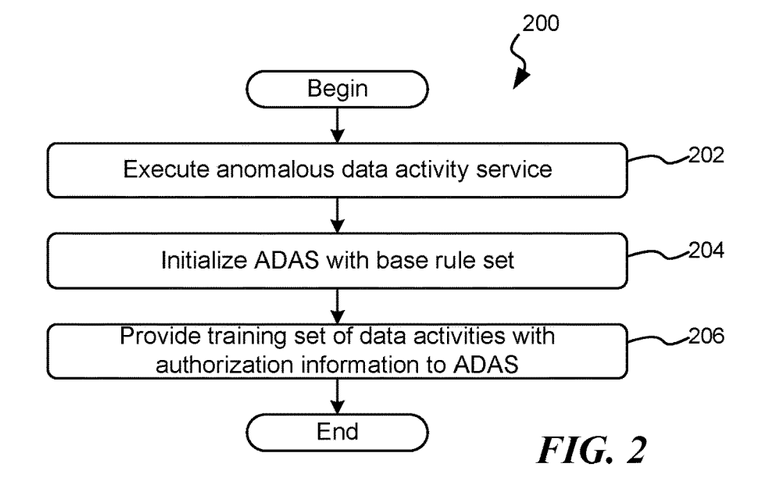
FIG. 2 is a flow diagram illustrating an exemplar routine suitable for starting or executing an online, adaptive anomalous data activity service, according to aspects of the disclosed subject matter.

Steps for providing the anomalous data activity service are set forth in regard to FIG. 2. More particularly, FIG. 2 is a flow diagram illustrating an exemplar routine 200 suitable for providing (including executing) an online, adaptive anomalous data activity service. Beginning at block 202, an anomalous data activity service is executed such that it operates in an online manner for responding to requests regarding data activities. The initial model (from which the service is executed) may or may not have any particular training in regard to specific rules for determining/predicted whether a given data activity is an anomalous (and, therefore, potentially unauthorized) data activity. Accordingly, at block 204, the anomalous data activity service (ADAS) is initialized with a base rule set regarding what can and cannot be done in regard to data activity. In this regard, data activity that is not authorized is viewed as anomalous behavior.

Advantageously and according to aspects of the disclosed subject matter, the base set of rules does not need to include all conditions that constitute authorized and/or unauthorized data activity. Indeed, since the anomalous data activity service is a machine learning, adaptive service, it can learn from interactions with users and/or administrators regarding what is and is not anomalous (and therefore potentially unauthorized) behavior. However, to the extent that the base set of rules is more robust (describes a greater variety of conditions in which data activity is or is not authorized), the anomalous data activity service is initialized with a greater ability to differentiate and/or predict anomalous data activity.

In addition to providing a base set of rules, with the anomalous data activity service being an adaptive service, a training set of data activities with corresponding authorization data (indicating whether the activity was or was not anomalous activity) is provided to the anomalous data activity service. In contrast to the base set of rules which provide a general framework for identifying anomalous data activities, the training set of data activities provides specific instances of authorized and unauthorized data activity from which the can refine its internal decision making processes for identifying anomalous data activity.

After executing the anomalous data activity service and, at least, initializing the service with a base set of rules and a training set of data activities, the routine 200 terminates.

Regarding the anomalous data activity service, while this service may be implemented entirely on a computer user's computing device, in various embodiments the service is implemented over multiple devices. More particularly, a client-side portion of the anomalous data activity service may execute on the computer user's computing device and a server-side portion of the anomalous data activity service may be implemented as an online service. In this particular configuration, computer users interact with the client-side portion of the service, while substantial portions of actually determining whether a particular data activity is anomalous may occur in the server-side portion. Correspondingly, initialization or activation of the anomalous data activity service on the user's computer may simply be establishing connection with the server-side portion which, for purposes of this discussion, will have been initialized with the base rule se4t as well as training sets.

Returning to FIG. 1, after providing an initialized anomalous data activity service, at block 104 the service awaits notice of a data activity by a computer user with regard to one or more data items. By way of example and illustration, notice may be in the form of a request from an application or service (including one or more services of an operating system) executing on a computing device and indicating that a computer user has issued an instruction that results in data activity. For example, a notice may be made when a computer user attempts to open/view a data file. Alternatively, a notice may be made when the computer user copies a data file to another location, modifies the contents of a file, saves or renames a file, and/or deletes a file. In addition to file operations, a notice may be made in regard to establishing (or attempting to establish) communications with other persons that are outside of an organization (or domain or subgroup). Establishing an online chat session (a session conducted over a network for real-time communicative interactions), identifying third party addresses in an email, establishing streaming services, and the like are examples of communications that produce unauthorized data activity, resulting in a notice of data activity for evaluation.

According to aspects of the disclose subject matter, the notice may be generated by an application that is currently being used, by a service and/or daemon that is configured to monitor for data activity, and/or one or more services with the operating system of the user's computing device. In regard to the operating system, the input/output (IO) subsystem of the operating system could be configured to detect a variety of user action that amount to data activity and generate a notice of the data activity.

At block 106, an evaluation of the data activity is made to determine whether the data activity is anomalous data activity. Generally speaking, the evaluation and determination is made by an anomalous data activity service that is operating on the user's computing device. However or alternatively, all or some of the evaluation/determination may be made by a cooperative, remotely operating anomalous data activity service. Whether conducted in whole or in part by the anomalous data activity service on the user's computer device, information regarding the detected data activity is provided to the anomalous data activity service for an evaluation/determination.

The evaluation by the anomalous data activity service is made according to the machine learning abilities of the anomalous data activity service. The machine learning bases for its determination includes the base rules and/or heuristics used during initialization of the machine learning anomalous data activity service, sensitivity labels associated with an item of data, training samples from which the machine learning anomalous data activity service has built up its internal basis of evaluation, authorizations associated with the user for conducting various data activities, prior instances of the computer user attempting the same or similar data activity as well as prior instances of others that have attempted the same or similar activities, and the like.

This information may include the detected data activity, the user that is requesting the activity, information about the targeted data, and activity-related information (such as the location where a copy will be made), that may be specific to the particular data activity.

In addition to the above and according to aspects of the disclosed subject matter, confidentiality labels may also be used to assist in identifying anomalous data activity. Indeed, one or more sets of confidentiality labels corresponding to levels of sensitivity or confidentiality, may be used on the various data items. Applications may be configured, including by way of add-in functionality, to permit a user (or administrator) to associate a level of confidentiality with each data item. By way of illustration and not limitation, a set of confidentiality labels may include: "non-business," "personal," "public," "general," "confidential" and "highly confidential," with each level corresponding to a particular level of confidentiality and/or sensitivity, and where the anomalous data activity service takes into account the particular level in determining whether the data activity is anomalous or not.

In regard to the labels, as indicated above, data generating, data manipulating, and/or communication applications may each be modified or configured to include the ability of a user to set a particular label for a data item. Of course, this may result in an analysis by the anomalous data activity service and blocked (as will be described below) if the user requesting the change does not have sufficient authorization to do so. Moreover, according to aspects of the disclosed subject matter, if a label is not present or associated with a data item in a system that utilizes labels, a default label may be inferred. Content stored on particular domains or devices, or maintained in various systems and/or databases, may be generally inferred to have a domain-wide or device-wide confidentiality label unless specifically overridden (either to more or less confidentiality) by one with authority to make such labeling/classification changes.

At decision block 108, a test is made as to whether the noticed data activity constitutes anomalous data activity as determined by the anomalous data activity service in block 106. If the anomalous data activity service identifies the noticed data activity as anomalous, the routine 100 proceeds to block 110 where a response activity is taken with regard to the anomalous activity. Alternatively, the anomalous data activity service does not identify the noticed data activity as anomalous, the routine proceeds to block 112.

Turning to the non-anomalous path, at block 112, the noticed data activity is permitted by the system. At block 114, the data activity is logged in a data activity log for further auditing and analysis as will be described below. Thereafter, the routine 100 returns to awaiting and receiving notice of additional data activity in block 104.

If, at decision block 108, the data activity is determined to be anomalous (suggesting that the data activity may be potentially unauthorized), the routine 100 proceeds to block 110 for action. As shown in FIG. 1, block 110 is comprises of multiple options with regard to what to do (i.e., a response activity) if the data activity is identified as anomalous (and, therefore, potentially unauthorized.) However, it should be appreciated that the various options described herein represent illustrative, but not exhaustive, options of response activities.

In regard to block 110 and based on the adaptive learning of the anomalous data activity service on the nature of the data activity as well as any user authorization issues and/or confidentiality labels, the anomalous data activity service may determine to allow the data activity, as indicated by block 110a, and proceed to block 110f where the data activity of the user is allowed. Alternatively, the anomalous data activity service may determine to advise the user of the anomalous data activity, as indicated in block 110b, and based on various criteria, including any user action, either allow the data activity in block 110f or block the data activity as indicated in block 110g. Yet another alternative is to confirm with the user, as indicated in block 110c, that the behavior (data activity) is anomalous and, based on the user's response either allow the activity (via block 110f) or block the activity (via block 110g). Other actions may include confirming with an administrator (as indicated in block 110d) and, based on the response from the administrator, either allow the activity or block the activity. Yet another option, of course, is to simply block the data activity.

By way of illustration, the anomalous data activity service may determine that communication with a particular party outside of an organization is new, and therefore anomalous, but because the data activity is in regard to a data item that is labeled as "public," the anomalous data activity service decides to simply allow the data activity. In another example, the anomalous data activity service may simply advise the user of the potential risk of the particular data activity (such as renaming a file that doesn't conform to company conventions) and permit the user to determine whether he/she wishes to proceed with the data activity. The anomalous data activity service may decide to confirm with the user that he/she wishes to carry on with a particular data activity, such as copying a file to a portable storage device (e.g., a small, portable USB device), and based on the response either allow or block the activity. In some instances a warning of data activity may be directed to others, such as a system administrator, for confirmation or instructions. For example, if a user is attempting to communicate (which may include protected, confidential data) with a party outside of an organization, prior to authorizing the data activity a confirmation from a system administrator may be needed. Of course, multiple actions may be carried out: e.g., confirm with user and with a system administrator in regard to a particular data activity.

After taking one or more appropriate actions (as discussed above) and as an important part of the machine learning process for the anomalous data activity service, at block 110h information regarding the data activity and corresponding information, as well as actions taken with regard to the activity, are provided to the anomalous data activity service as a learning sample. For example, assume that an employee of an organization enters into a joint development project with another party outside of the organization, and it is expected that the two will share confidential information. While a rule may be generated that covers the specific scenario, with an adaptive anomalous data activity service, after one or a few times in which the employee communicates sensitive information to the other party is identified as anomalous though ultimately allowed, the adaptive anomalous data activity service may become sufficiently trained to recognize that the employee has permission to carry out the particular data activity and that particular data activity might no longer be viewed as anomalous.

Figure 3:
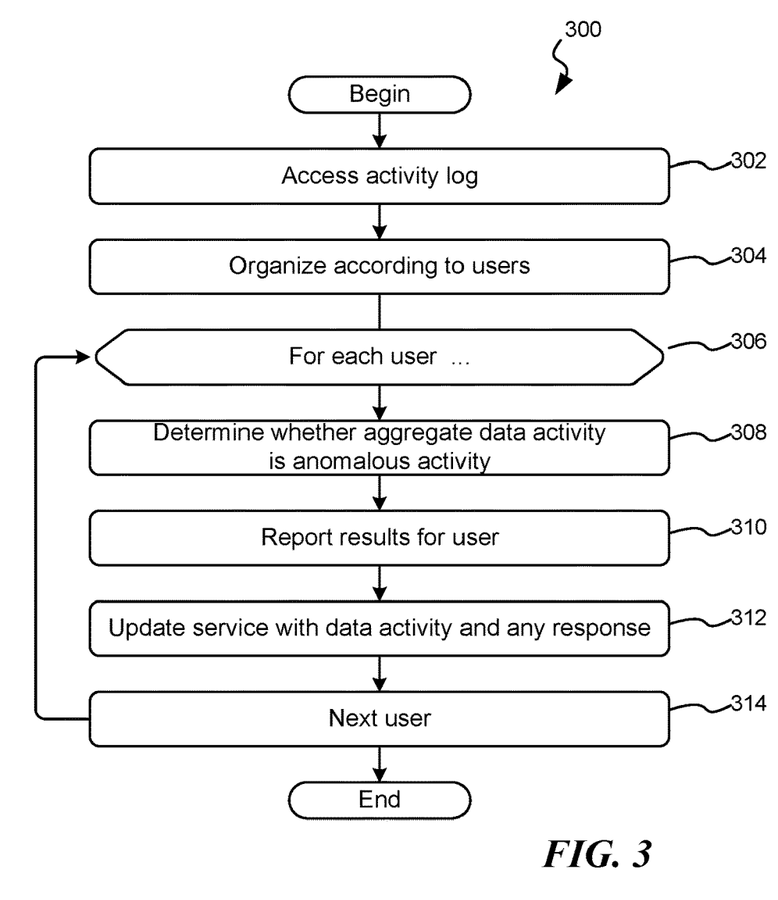
FIG. 3 is a flow diagram illustrating an exemplary routine suitable for aggregating user data activities and evaluating the activities for anomalous behavior, according to aspects of the disclosed subject matter.

After permitting the data activity (in block 112) or after having processed the anomalous data activity (in block 110), at block 114 the data activity, along with related information (such as a user identifier, the action taken, identity of a receiving third party, and the like), is saved in an activity log for further auditing (as set forth in regard to FIG. 3). Thereafter, the routine 200 returns to block 104 where additional data activities may be processed. Typically, this routine 200, rather than terminating, continues operating as described above until the computing device upon which it is operating is shut down or restarted.

In addition to at-the-moment evaluations and determinations with regard to data activities, it is possible that some data activities, in isolation from an aggregation of many data activities, are viewed as typical (non-anomalous) and, therefore, allowed. Alternatively, some data activities may be identified as anomalous and blocked. Indeed, some data activities should be evaluated in aggregation to fully determine whether the data activities were anomalous and unauthorized. For example, an employee, in anticipation of leaving a company, may begin to copy important files to a local, portable drive. While rules or adaptive learning may permit copying of some data such that employees can work at home on their projects, copying large numbers of sensitive files, or files that the employee does not typically access, may be viewed as unauthorized data activity.

FIG. 3 is a flow diagram illustrating an exemplary routine 300 suitable for aggregating user data activities and evaluating the activities for anomalous behavior, according to aspects of the disclosed subject matter. Beginning at block 302, an activity log of data activities of a plurality of user is accessed. At block 304, the data activities are ordered according to user, such that the user's data activities, in aggregation, may be evaluated for anomalous behavior.

At block 306, an iteration loop is begun to iterate through each of the user aggregations. Thus, with reference to a "current" user, at block 308, an evaluation of the current user's aggregate data activities is evaluated by the anomalous data activity service. At block 310, the results of the evaluation (e.g., that the aggregate behavior of the user is anomalous or not) is reported and optional actions (not shown) may be taken. At block 312, the aggregated data activities, relevant information including any action that may be optionally take as a result, are provided to the anomalous data activity service as a training sample for refined analysis.

At block 314, if there are additional users to process/iterate, the routine 300 returns to block 306. Alternatively, if there are no remaining uses to process, the routine 300 terminates.

Regarding routines 100-300 described above, as well as other processes that may be described herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions steps are encoded.

Of course, while the routines and/or processes include various novel features of the disclosed subject matter, other steps (not listed) that support key elements of the disclose subject matter set forth in the routines/processes may also be included and carried out in the execution of these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 5 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes, Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 4:
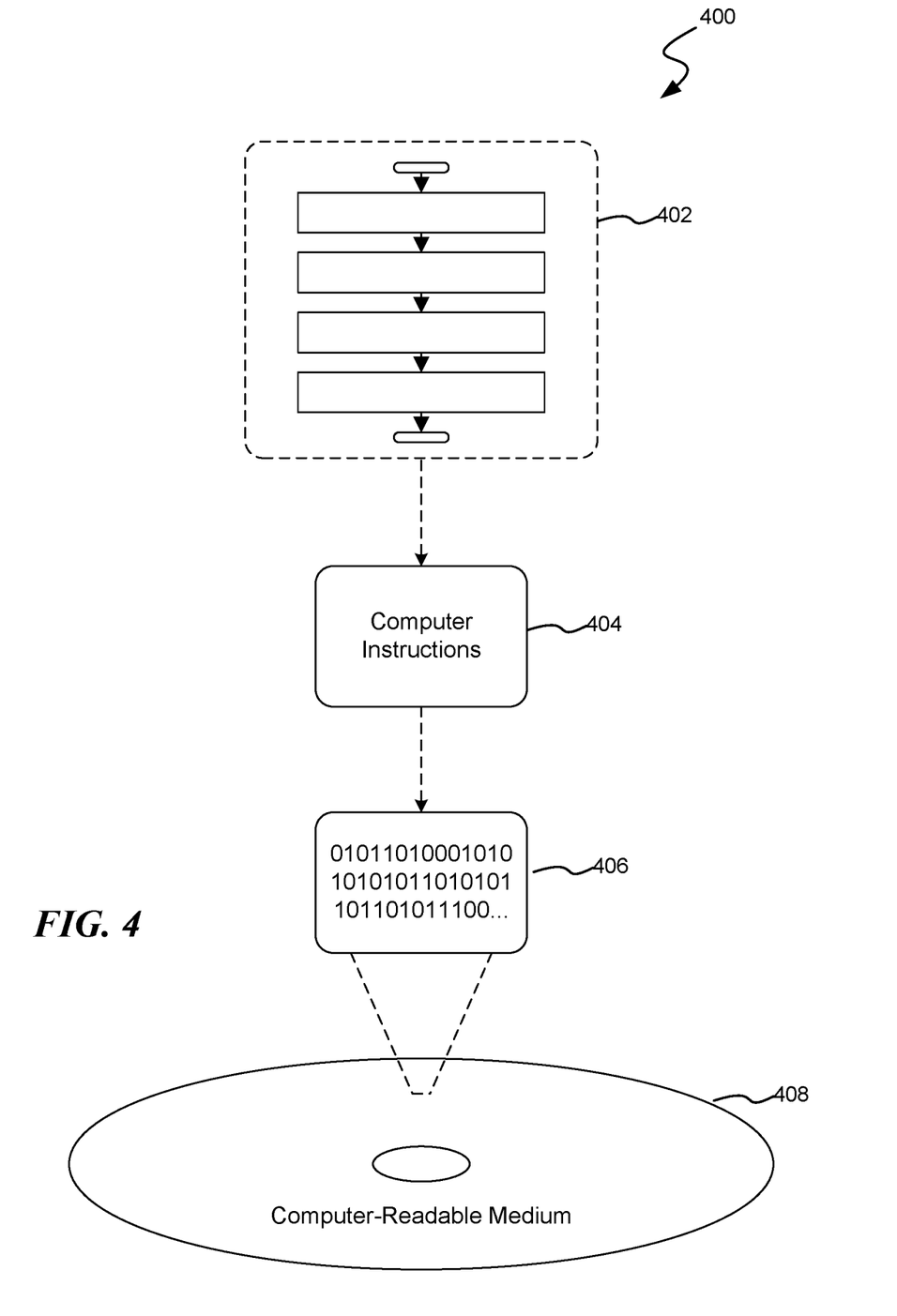
FIG. 4 is a block diagram illustrating an exemplary computer readable medium encoded with instructions for providing one or more elements of an online, adaptable anomalous data activity service, according to aspects of the disclosed subject matter.

Regarding computer readable media, FIG. 4 is a block diagram illustrating an exemplary computer readable medium encoded with instructions for providing one or more elements of an online, adaptable anomalous data activity service, as described in regard to FIG. 1. More particularly, the implementation 800 comprises a computer-readable medium 808 (e.g., a CD-R, DVD-R or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of exemplary method 100, for example. In another such embodiment, the processor-executable instructions 804 may be configured to implement a system on a computing device, such as at least some of the exemplary, executable components of system 900 of FIG. 9, as described below, Many such computer readable media may be devised, by those of ordinary skill in the art, which are configured to operate in accordance with the techniques presented herein.

Figure 5:
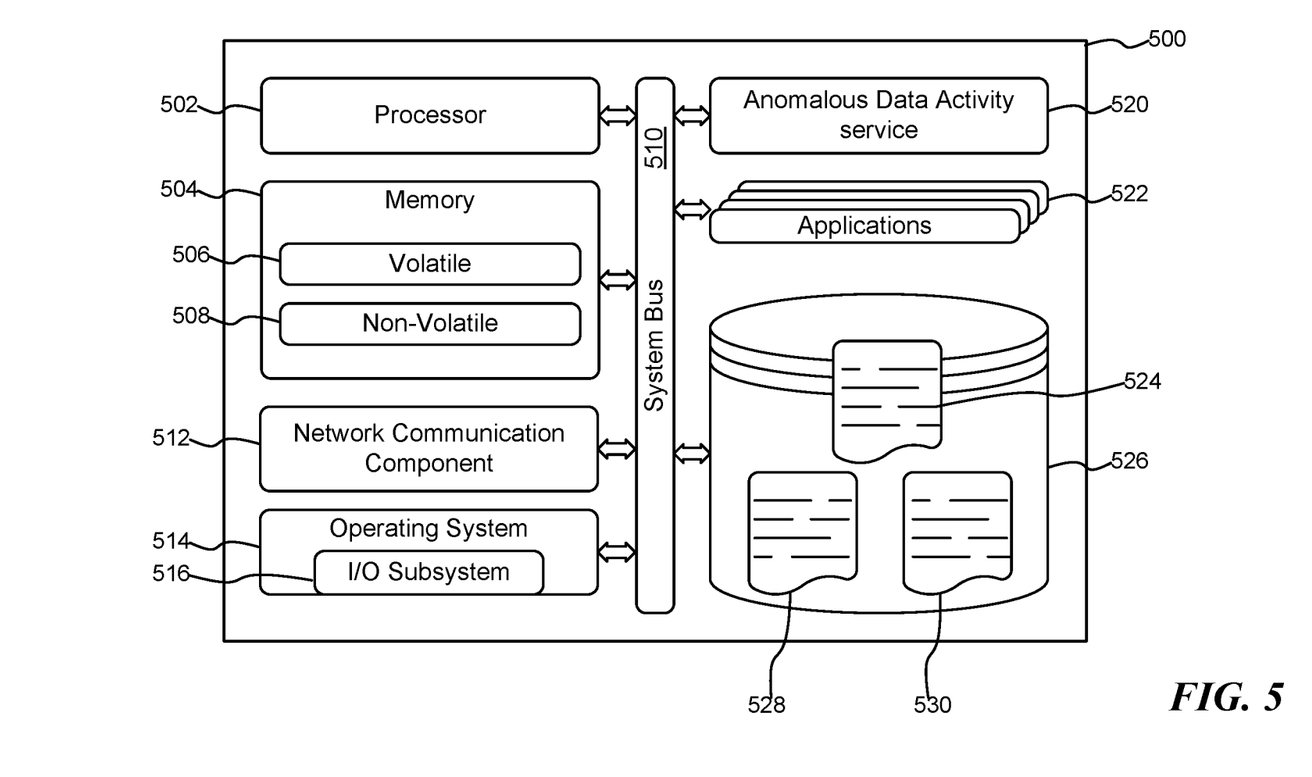
FIG. 5 is a block diagram illustrating an exemplary user computing device suitable for implementing aspects of the disclosed subject matter, particularly in regard to providing an anomalous data activity detection service.

Turning now to FIG. 5, FIG. 5 is a block diagram illustrating an exemplary user computing device 500 suitable for implementing aspects of the disclosed subject matter, particularly in regard to providing an anomalous data activity detection service. A suitably configured user computing device may comprise any of a number of computing devices including, by way of illustration and not limitation, a desktop computer, a laptop/notebook computer, a tablet computer, a mobile phone and/or other personal computing devices in which a computer user may interact with protected data. Generally speaking, irrespective of the particular type of computing device, the computing device 500 typically includes one or more processors (or processing units), such as processor 502, and further includes at least one memory 504. The processor 502 and memory 504, as well as other components of the computing device 500, are interconnected by way of a system bus 510.

As will be appreciated by those skilled in the art, the memory 504 typically (but not always) comprises both volatile memory 506 and non-volatile memory 508. Volatile memory 506 retains or stores information so long as the memory is supplied with power. In contrast, non-volatile memory 508 is capable of storing (or persisting) information even when a power supply is not available. Generally speaking, RAM and CPU cache memory are examples of volatile memory 506 whereas ROM, solid-state memory devices, memory storage devices, and/or memory cards are examples of non-volatile memory 508.

As will also appreciated by those skilled in the art, the processor 502 executes instructions retrieved from the memory 504, from computer readable media, such as computer readable media 400 of FIG. 4, and/or other executable components in carrying out various functions of providing personal assistance to a person. The processor 502 may be comprised of any of a number of available processors such as single-processor, multi-processor, single-core units, and multi-core units, which are well known in the art.

Further still, the illustrated computing device 500 typically includes a network communication component 512 for interconnecting this computing device with other devices and/or services over a computer network. The network communication component 512, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication component, such as network communication component 512, is typically comprised of hardware and/or firmware components (and may also include or comprise executable software components) that transmit and receive digital and/or analog signals over a transmission medium (i.e., the network.)

In addition to the various component identified above, the computing device 500 further includes an operating system 514 that provide system software and/or services for the computing device, which manages both hardware and software resources of the computer. As will be appreciated by those skilled in the art, the operating system also provides a common set of services for the execution of executable modules, including applications, services, drivers, daemons, processes, and the like, on the computing device 500.

According to aspects of the disclosed subject matter, all or some portion of the operating system 514 may be suitably configured to connect with an anomalous data activity service, such as the anomalous data activity service 520, as a user of the computing device performs one or more data activity functions, including (by way of illustration and not limitation) opening, saving, modifying, copying, moving, and/or deleting a file. In particular, the I/O (input/output) subsystem 516 may be configured to detect these and other data activities and contact or notify the anomalous data activity service 520 as described above.

Still further included in the exemplary computing device 500 is the anomalous data activity service 520. According to various embodiments of the disclosed subject matter, the anomalous data activity service 520 may be implemented on the computing device 500 to implement all of the functionality of the service as set forth above, particularly in regard to routine 100 of FIG. 1. Alternatively, the anomalous data activity service 520 may be implemented on the user's computing device as a user-side or client-side service in that it receives notifications of data activity from various sources (e.g., the operating system and/or various applications 522) and communicates that information to a remotely operating service-side anomalous data activity service.

As suggested, the exemplary computing device 500 may also include one or more applications, such as application 522, that are configured to notify the anomalous data activity service 520 with regard to any data activity of the user. Still further, the various applications, including application 522, may also be configured to provide labeling services to associate sensitivity labels/classifications with the various items of content and data.

Still further included in the exemplary computing device 500 is a data store 526. The data store may store (depending on the configuration as set forth above) an activity log 524 recording the data activities and responses of the anomalous data activity service, base rules 528 for initializing the anomalous data activity service, and a training set 530 of sample actions for training the anomalous data activity service.

Figure 6:
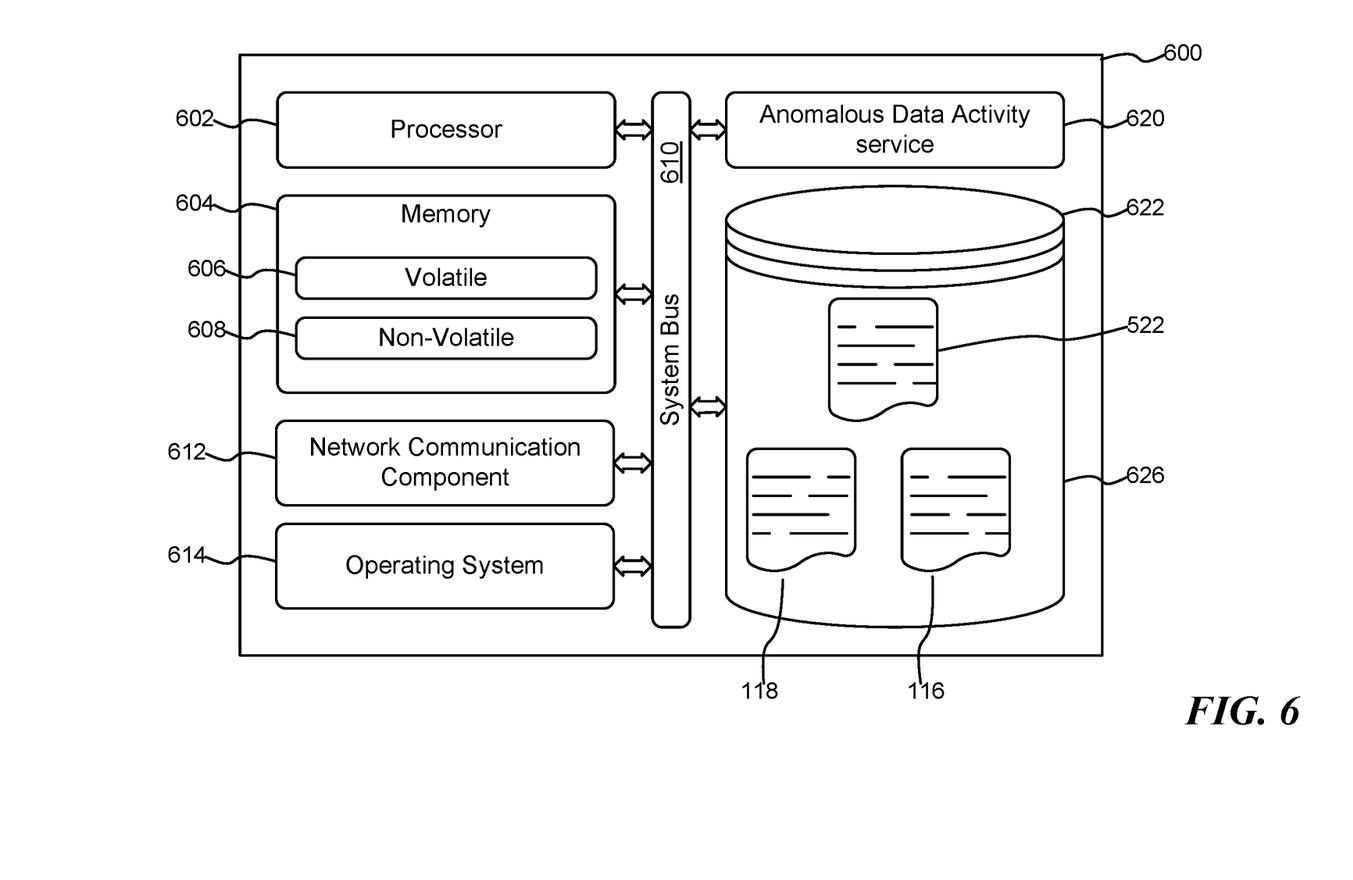
FIG. 6 is a block diagram illustration an exemplary server computing device suitable for implementing aspects of the disclosed subject matter, particularly in regard to providing server-side anomalous data activity detection services.

In regard configurations where a server-side portion of the anomalous data activity service operates, FIG. 6 is a block diagram illustration an exemplary server computing device 600 suitable for implementing aspects of the disclosed subject matter. In particular and in similar manner to the user computing device 500 of FIG. 5, the exemplary server computing device 600 includes one or more processors (or processing units), such as processor 602, and further includes at least one memory 604. The processor 602 and memory 604, as well as other components of the computing device 600, are interconnected by way of a system bus 610.

The memory 604 typically (but not always) comprises both volatile memory 606 and non-volatile memory 608, The processor 602 executes instructions retrieved from the memory 604, from computer readable media, such as computer readable media 400 of FIG. 4, and/or other executable components in carrying out various functions of providing personal assistance to a person. Further still, the illustrated server computing device 600 typically includes a network communication component 612 (or NIC) for interconnecting this computing device with other devices and/or services over a computer network, including a user computing device 500.

In addition to the various component identified above, the exemplary server computing device 600 further includes an operating system 614 that provide system software and/or services for the computing device, which manages both hardware and software resources of the computer.

An executable server-side anomalous data activity service 620 is configured, in execution, to receive information from a client-side anomalous data activity service 520 in regard to data activity of a computer user. As set forth above in regard to routine 100 of FIG. 1, the server-side anomalous data activity service 620 determines/predicts whether data activity of a computer user is considered anomalous and indicates to the client-side anomalous data activity service 520 instructions and/or information regarding the determination as well as any actions that should be carried out.

Still further included in the exemplary server-side computing device 600 is a data store 626. The data store may store (depending on the configuration as set forth above) an activity log 624 recording the data activities and responses of the anomalous data activity service, base rules 628 for initializing the anomalous data activity service, and a training set 630 of sample actions for training the anomalous data activity service.

Regarding the various components of the exemplary computing devices 500 and 600, those skilled in the art will appreciate that many of these components may be implemented as executable software modules stored in the memory of the computing device, as executable hardware modules and/or components (including SoCs—system on a chip), or a combination of the two. Indeed, components may be implemented according to various executable embodiments including executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions and features described herein.

Moreover, in certain embodiments each of the various components of the exemplary computing devices 500 and 600 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network as in known in the art.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for responding to an anomalous data activity on a computing device, the method comprising:
    initializing an anomalous data activity service, the anomalous data activity service being a machine learning service for identifying whether a data activity is an anomalous data activity that adaptively learns based at least on confidentiality labels assigned to data items;
    receiving notice of a data activity regarding an item of data by a computer user using the computing device;
    evaluating the data activity regarding the item of data to determine whether the data activity is an anomalous data activity;
    upon determining that the data activity regarding the item of data is an anomalous data activity, carrying out a response activity regarding the anomalous data activity; and
    updating the anomalous data activity service according to the response activity in view of the anomalous data activity.

2. The computer implemented method of claim 1, wherein the item of data is associated with a sensitivity label, and wherein evaluating the data activity regarding the item of data to determine whether the data activity is an anomalous data activity comprises evaluating the data activity in view of the sensitivity label associated with the item of data.

3. The computer implemented method of claim 2, wherein evaluating the data activity regarding the item of data to determine whether the data activity is an anomalous data activity further comprises evaluating the data activity in view of base rules for conducting data activities.

4. The computer implemented method of claim 3, wherein evaluating the data activity regarding the item of data to determine whether the data activity is an anomalous data activity further comprises evaluating the data activity in view of one or more prior instances of the same or similar data activity by the computer user.

5. The computer implemented method of claim 4, wherein evaluating the data activity regarding the item of data to determine whether the data activity is an anomalous data activity further comprises evaluating the data activity in view of one or more prior instances of the same or similar data activity by other users.

6. The computer implemented method of claim 1, wherein evaluating the data activity regarding the item of data to determine whether the data activity is an anomalous data activity comprises submitting the data activity to a cooperative, remotely operating anomalous data activity service.

7. The computer implemented method of claim 1, wherein carrying out the response activity comprises advising the user that the data activity is an anomalous data activity.

8. The computer implemented method of claim 1, wherein carrying out the response activity comprises confirming with the user the user's intent to carry out the data activity.

9. The computer implemented method of claim 1, wherein carrying out the response activity comprises obtaining confirmation from a third-party system administrator whether the user is authorized to carry out the data activity.

10. The computer implemented method of claim 9, wherein carrying out the response activity further comprises, based on the confirmation response of the third-party system administrator, allowing the data activity to occur.

11. The computer implemented method of claim 1, wherein carrying out the response activity comprises disallowing the data activity to occur.

12. The computer implemented method of claim 1, further comprising logging the data activity of the user in an activity log.

13. The computer implemented method of claim 1, further comprising:
    aggregating data activity of the computer user; and
    determining whether the aggregated data activity of the user is anomalous data activity.

14. The computer implemented method of claim 1, wherein the confidentiality labels are assigned to data items by computer application users.

15. A computing device for responding to an anomalous data activity by a computer user on the computing device, the computing device comprising a processor and a memory, wherein the processor executes instructions as part of, or in conjunction with, executable components in responding to an anomalous data activity, the additional components comprising:
    an executable anomalous data activity service, the anomalous data activity service being a machine learning service for identifying whether a data activity is an anomalous data activity that adaptively learns based at least on confidentiality labels assigned to data items, and in execution:
        receives notice of a data activity regarding an item of data by a computer user using the computing device;
        evaluates the data activity regarding the item of data to determine whether the data activity is an anomalous data activity;
        upon determining that the data activity regarding the item of data is an anomalous data activity, carries out a response activity regarding the anomalous data activity; and updates the anomalous data activity service according to the response activity in view of the anomalous data activity.

16. The computing device of claim 15, wherein the item of data is associated with a sensitivity label, and wherein evaluating the data activity regarding the item of data to determine whether the data activity is an anomalous data activity comprises evaluating the data activity in view of the sensitivity label associated with the item of data.

17. The computing device of claim 16, wherein evaluating the data activity regarding the item of data to determine whether the data activity is an anomalous data activity further comprises evaluating the data activity in view of base rules for conducting data activities.

18. The computing device of claim 17, wherein evaluating the data activity regarding the item of data to determine whether the data activity is an anomalous data activity further comprises evaluating the data activity in view of one or more prior instances of the same or similar data activity by the computer user.

19. The computing device of claim 18, wherein evaluating the data activity regarding the item of data to determine whether the data activity is an anomalous data activity further comprises evaluating the data activity in view of one or more prior instances of the same or similar data activity by other users.

20. A computer readable medium bearing computer executable instructions which, when executed on a computing system comprising at least a processor, carry out a method for responding to an anomalous data activity by a computer user, the method comprising:

initializing an anomalous data activity service, the anomalous data activity service being a machine learning service for identifying whether a data activity is an anomalous data activity that adaptively learns based at least on confidentiality labels assigned to data items;

receiving notice of a data activity regarding an item of data by a computer user using the computing device;

evaluating the data activity regarding the item of data to determine whether the data activity is an anomalous data activity;

upon determining that the data activity regarding the item of data is an anomalous data activity, carrying out a response activity regarding the anomalous data activity; and updating the anomalous data activity service according to the response activity in view of the anomalous data activity.

* * * * *